(12) United States Patent
Abe et al.

(10) Patent No.: US 6,242,693 B1
(45) Date of Patent: Jun. 5, 2001

(54) OVERHEAD CABLE

(75) Inventors: Ken Abe; Takeo Munakata; Takashi Shinohara, all of Tokyo (JP)

(73) Assignee: The Furukawa Electric Co., Ltd, Tokyo (JP)

( * ) Notice: Subject to any disclaimer, the term of this patent is extended or adjusted under 35 U.S.C. 154(b) by 0 days.

(21) Appl. No.: 09/671,677

(22) Filed: Sep. 28, 2000

Related U.S. Application Data

(62) Division of application No. 08/622,832, filed on Mar. 27, 1996, now Pat. No. 6,147,303.

(30) Foreign Application Priority Data

Mar. 28, 1995 (JP) ...................................... 7-070148

(51) Int. Cl.⁷ ........................................................ H02G 7/00
(52) U.S. Cl. .................... 174/40 R; 174/42; 174/117 R; 174/127; 174/129
(58) Field of Search .................... 174/40 R, 42, 174/117 R, 127, 129

(56) References Cited

U.S. PATENT DOCUMENTS

| | | | |
|---|---|---|---|
| D. 186,072 | 9/1959 | Scofield | D26/1 |
| 3,033,916 | 5/1962 | Scofield | 174/117 |
| 3,388,208 | 6/1968 | Lieberman et al. | 174/42 |
| 3,641,251 | 2/1972 | Liao | 174/40 R |
| 3,813,772 | 6/1974 | Adams | 29/624 |
| 3,991,550 | 11/1976 | Cohen | 57/144 |
| 3,992,566 | 11/1976 | Kerimov et al. | 174/42 |
| 4,549,035 | 10/1985 | Zaltsberg | 174/42 |
| 4,605,819 | 8/1986 | Warburton | 174/127 |
| 4,687,884 | 8/1987 | Dehart | 174/130 |
| 4,829,929 | 5/1989 | Kerfoot | 114/243 |
| 4,944,570 | 7/1990 | Oglesby et al. | 350/96.23 |
| 4,966,635 | 10/1990 | Sato | 148/275 |
| 5,171,942 | 12/1992 | Powers | 174/129 R |
| 6,147,303 | * 11/2000 | Abe et al. | 174/42 |

* cited by examiner

Primary Examiner—Dean A. Reichard
Assistant Examiner—W. David Walkenhorst
(74) Attorney, Agent, or Firm—Arent Fox Kintner Plotkin & Kahn, PLLC

(57) ABSTRACT

An overhead power transmission line formed by stranding at least one outwardly projecting strand at the outermost layer of an overhead power transmission line formed by a plurality of strands. At least the outwardly projecting portion of the outwardly projecting strand is composed of an organic material. The outwardly projecting strand has a projection height H within a range defined as 1.5 mm≦H≦7.0 mm. By setting the projection height H of the outwardly projecting strand equal to or larger than 1.5 mm, the wind noise characteristic can be conspicuously improved. Further, by setting H≦7.0 mm, the outwardly projecting strand comprised by an organic material is made easily crushable, so the gripping portions of spacers, dampers, and other parts which have been conventionally used can be used as they are.

9 Claims, 10 Drawing Sheets

FIG. 16
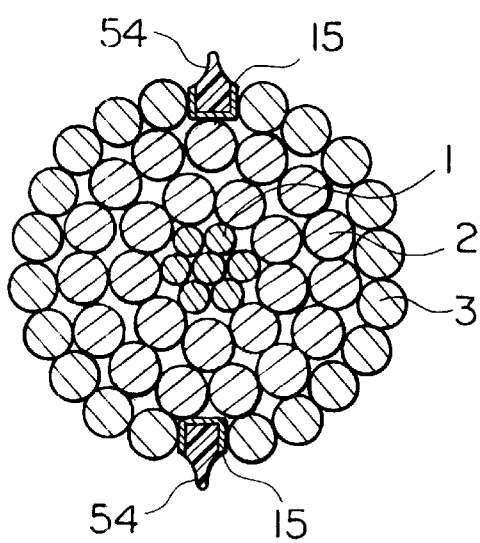
FIG. 17
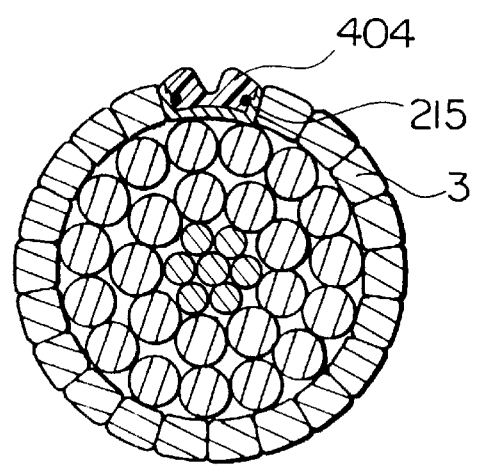
FIG. 18A   FIG. 18B   FIG. 18C   FIG. 18D
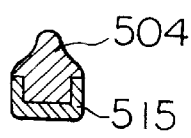 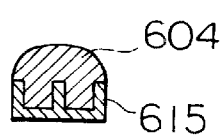  

A : COMP. Ex.2
B : Ex.5
C : COMP. Ex.3

OVERHEAD CABLE

This application is a divisional application filed under 37 CFR §1.53(b) of parent application Ser. No. 08/622,832, filed Mar. 27,1996, now U.S. Pat. No. 6,147,303.

BACKGROUND OF THE INVENTION

1. Field of the Invention

The present invention relates to an overhead cable (including an overhead power transmission line and an overhead ground wire) which prevents wind noise and corona noise and, at the same time, reduces the wind pressure.

2. Description of the Related Art

When wind blows against a laid overhead power transmission line, for example, a Karman vortex is generated on the downwind side of the overhead power transmission line and wind noise is caused. To prevent this wind noise, it is effective to provide a projection at the outer periphery of the overhead power transmission line to disturb the Karman vortex.

For this reason, conventionally, for example as shown in Japanese Examined Patent Publication (Kokoku) No. 53-14146, a spiral rod made of metal, formed by an aluminum wire etc., was wound around the outermost layer of the overhead power transmission line to provide the projection and this projection was used to disturb the Karman vortex and thereby prevent the wind noise.

When winding a spiral rod made of metal around the outermost layer of the overhead power transmission line, however, there arises a problem that corona noise is apt to be generated during rain.

The cause of this is that the electric field becomes stronger at the surface of the projection, so when rain is deposited there to form drops of water which subsequently drop down, a strong discharge occurs.

To prevent the corona discharge described above, it is known to form the spiral rod by a semiconductor material and an insulating material (refer to Japanese Unexamined Patent Publication (Kokai) No. 3-277114). When such a spiral rod is used, since the insulating material does not have any effect on the electric field distribution, the rod is effective for suppressing corona noise at the time of rain.

However, the work of winding the spiral rod around the outermost layer of the overhead power transmission line was very cumbersome.

Therefore, an overhead power transmission line formed by stranding an outwardly projecting strand at the outermost layer of the overhead power transmission line has been proposed (Japanese Examined Patent Publication (Kokoku) No. 6-42328).

When preliminarily winding the outwardly projecting metal strand around the outermost layer of the overhead power transmission line in this way, there is the advantage that it becomes unnecessary to wind a spiral rod later.

When stranding an outwardly projecting metal strand at the outermost layer of the overhead power transmission line, however, the weight of the overhead power transmission line is increased, and therefore there is a problem that the strength of the cable supporting structures such as the steel towers and insulators has to be increased. Further, there is a problem that it is necessary to newly prepare the gripping portions of spacers, dampers, and other parts for gripping the overhead power transmission line to match with the outwardly projecting metal strand.

SUMMARY OF THE INVENTION

The present invention was made in consideration with the above problems and has its object to provide an overhead cable which reduces the weight of an overhead cable formed by stranding an outwardly projecting strand at the outermost layer of the strands, enables conventional gripping portions of parts to be used as they are, and effectively prevents wind noise and corona noise.

To achieve the above object, the present invention provides an overhead cable formed by stranding at the outermost layer of an overhead cable comprised of a plurality of strands at least one outwardly projecting strand, wherein at least the outwardly projecting portion of the outwardly projecting strand is composed of an organic material.

Preferably a projection height H of the outwardly projecting strand from the outer circumferential surface of the ordinary strands positioned on the outermost circumference is within a range of from 1.5 mm$\leq$H$\leq$7.0 mm.

Preferably a reinforcing core is provided in the internal portion of the outwardly projecting strand.

Preferably the surface of the outwardly projecting strand is subjected to hydrophilic processing.

Preferably small uneven portions are provided on the surface of the outwardly projecting strand.

It is also possible to form the outwardly projecting strand by integrally forming a semiconductor body formed at a lower portion and an insulator formed at an upper portion.

It is also possible to strand two outwardly projecting strands adjacent to each other and form a groove between these outwardly projecting strands.

It is also possible to fit a holding strand in this groove.

Preferably the outwardly projecting strand is provided with an anti-unraveling means for preventing unraveling due to breakage.

Preferably the anti-unraveling means is for example comprised of side projections formed on the two sides of the outwardly projecting strand, which side projections are fit in the grooves of the ordinary strands positioned on the two sides of the outwardly projecting strand.

It is also possible to make the anti-unraveling means bottom projections formed at the two sides of the bottom of the outwardly projecting strand, which bottom projections are pressed inward at the bottoms of the ordinary strands positioned at the two sides of the outwardly projecting strand.

It is also possible to make the members constituting the bottom projections semiconductor members separate from the member constituting the outwardly projecting strand and join them to the outwardly projecting strand.

In the overhead cable according to the present invention, by forming the outwardly projecting strand by an organic material, the weight of the overhead cable can be reduced. For this reason, it becomes unnecessary to increase the strength of the steel towers and other supporting structures and the cost of construction of the steel towers etc. can be reduced.

Also, by setting the projection height H of the outwardly projecting strand equal to or larger than 1.5 mm, the wind noise characteristic can be conspicuously improved. Further, by making H less than or equal to 7.0 mm, the outwardly projecting strand made of the organic material can be easily crushed, so the gripping portions of parts such as spacers and dampers which have been conventionally used can be used as they are.

Further, in the present invention, by providing a reinforcing core in the internal portion of the outwardly projecting strand, the strength of the outwardly projecting strand can be improved, so breakage of the outwardly projecting strand can be effectively prevented. Further, when a metal is used as the reinforcing core, the linear expansion rate of the outwardly projecting strand can be made close to the linear expansion rate of the ordinary metal strands constituting the cable, so even when there are severe temperature changes, it is possible to maintain a state with the outwardly projecting strand reliably stranded in the cable.

Further, by providing an anti-unraveling means for preventing unraveling due to breakage of the outwardly projecting strand, the outwardly projecting strand will not unravel even if breaking, so short-circuits and other accidents caused due to the unraveling of a broken strand can be reliably prevented.

Further, when the surface of the outwardly projecting strand is subjected to hydrophilic processing, the water drops will not become spherical, therefore the corona noise can be effectively prevented.

Furthermore, by providing small uneven portions on the surface of the outwardly projecting strand, the position of the vortex generated on the downwind side of the cable can be moved to the rear of the cable, so the difference of the pressure between the upwind side and downwind side becomes small, and therefore the wind pressure can be reduced.

BRIEF DESCRIPTION OF THE DRAWINGS

These and other objects and features of the present invention will become more apparent from the following description of the preferred embodiments made with reference to the accompanying drawings, in which:

FIGS. 2 to 16 are laterally sectional views of other embodiments of the present invention;

FIG. 17 is a laterally sectional view of one part of the overhead power transmission line according to another embodiment of the present invention;

FIGS. 18A to 18D are sectional views of other embodiments of outwardly projecting strands useable in the present invention;

DESCRIPTION OF THE PREFERRED EMBODIMENTS

Figure 1:
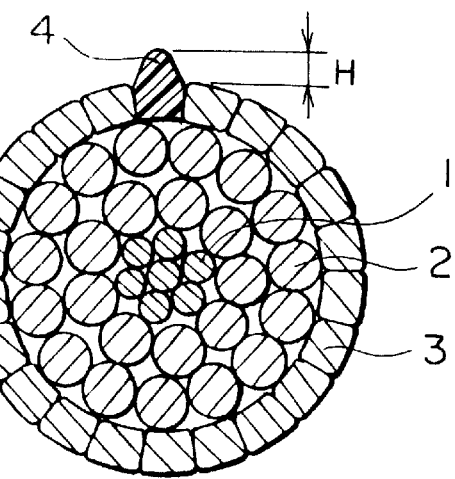
FIG. 1 is a laterally sectional view of an overhead power transmission line according to an embodiment of the present invention.

Below, the present invention will be explained in detail by referring to the drawings.

FIG. 1 shows an overhead power transmission line according to an embodiment of the present invention. The overhead power transmission line of the present embodiment is constituted by stranding two layers of aluminum strands 2 having a round cross-section on a plurality of steel cores 1 and stranding aluminum strands 3 having an arcuate cross-section around the outer periphery thereof. One of the aluminum strands 3 of the outermost layer of this overhead power transmission line projects outward. This outwardly projecting strand 4 is formed by an organic material.

As the organic material, a plastic, rubber, or the like can be used. Particularly, a nylon, polyethylene, polytetraethylene fluoride, etc. are preferred. The strand 4 formed by the organic material may not only be made an insulator, but also a semiconductor or a combination of a semiconductor and an insulator. When the outwardly projecting strand 4 is formed by an organic material as described above, the overhead power transmission line can be reduced in weight.

Further, the projection height H of the outwardly projecting strand 4 is preferably made 1.5 mm$\leq$H$\leq$7.0 mm. The reason for this will be explained later.

Further, the surface of the outwardly projecting strand 4 is preferably processed to make it hydrophilic by a physical means such as sand blasting or a chemical means such as ozone processing, ultraviolet irradiation, and acid treatment from the viewpoint of the prevention of the corona noise.

Figure 2:
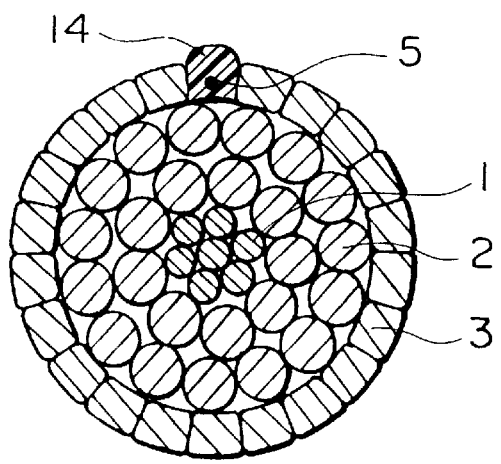

FIG. 2 shows the overhead power transmission line according to another embodiment of the present invention. A reinforcing core 5 having a circular cross-section is provided in the internal portion of the outwardly projecting strand 14 formed by the organic material.

As the reinforcing core 5, an iron wire, steel wire, copper wire, aluminum wire, aluminum-coated steel wire, FRP wire, etc. can be used.

By providing the reinforcing core 5 having a circular cross-section in the internal portion of the outwardly projecting strand 14 formed by the organic material in this way, the breakage of the outwardly projecting strand 4 can be effectively prevented. Further, when a metal is used as the reinforcing core 5, the linear expansion rate of the outwardly projecting strand 14 can be made close to the linear expansion rate of the aluminum strands 3 constituting the cable, therefore there is an advantage that even if there are severe temperature changes, it is possible to maintain a state with the outwardly projecting strand 14 stranded in the aluminum strands 3.

Figure 3:
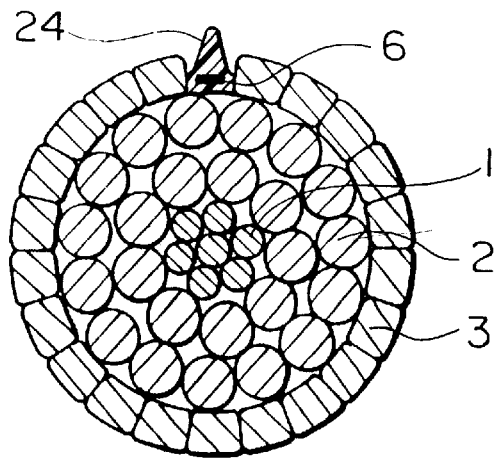

FIG. 3 shows an overhead power transmission line according to another embodiment of the present invention. A reinforcing core material 6 having an arcuate cross-section is provided in the internal portion of the outwardly projecting strand 24 formed by the organic material. When a reinforcing core material 6 having the arcuate cross-section is used, there is an advantage that the strength can be improved over that of a reinforcing core 5 having a circular cross-section.

Figure 4:
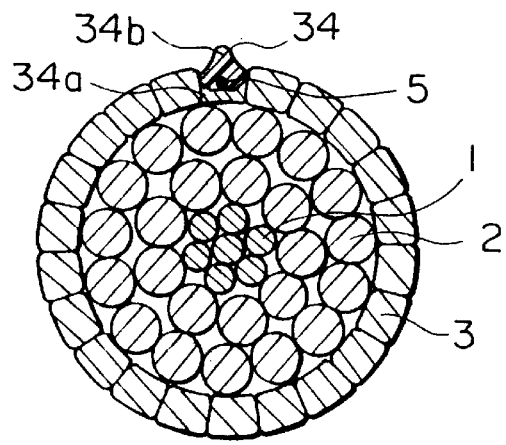

FIG. 4 shows an overhead power transmission line according to another embodiment of the present invention. The outwardly projecting strand 34 formed by the organic material is obtained by a combination of a semiconductor 34a formed at a lower portion and an insulator 34b formed at an upper portion. A reinforcing core 5 having a round cross-section is arranged inside this. The semiconductor 34a contacts the lower portions of the strands 3 at the two sides of the outwardly projecting strand 34 and electrically connects the strands 3 of the outermost layer insulated by the insulator 34b. For this reason, it is possible to reliably prevent a gap discharge between the strands 3 of the outermost layer positioned on the two sides of the insulator 34. Note that, as the material constituting the semiconductor, one having a conductivity of about $1\times10^{-3}(\%)$ to $5\times10^{-5}(\%)$ is preferred. Although not particularly restricted, mention may be made of high molecular polymer, such as polyamide resin, polyetylene resin, polypropylene resin, etc.

Figure 5:
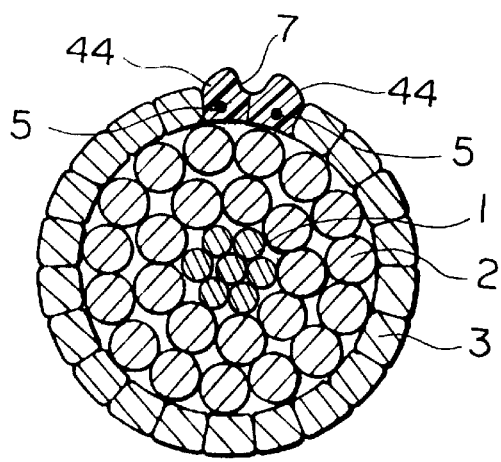

FIG. 5 shows an overhead power transmission line according to another embodiment of the present invention. Two outwardly projecting strands 44 formed by an organic material are arranged in parallel. At the abutting portions of the two outwardly projecting strands 44, a groove 7 having a U-shaped cross-section is formed. By providing a groove 7 having a U-shaped cross-section at the abutting portions of the two outwardly projecting strands 44 in this way, drops of water easy enter into the groove 7, therefore the drops of water will not form projections, and the corona noise can be effectively prevented.

Figure 6:
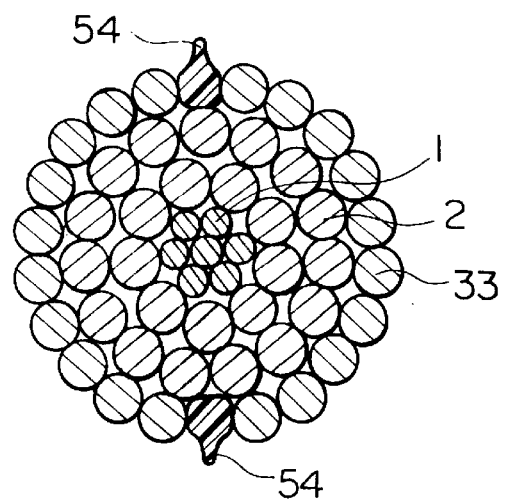

FIG. 6 shows an overhead power transmission line according to another embodiment of the present invention. The strands 33 of the outermost layer are constituted by strands having a circular cross-section. Outwardly projecting strands 54 formed by an organic material are provided at positions facing each other 180 degrees apart.

Note that, in FIG. 2 to FIG. 6, in the same way as the embodiment shown in FIG. 1, the projection height H of the outwardly projecting strands 14, 24, 34, 44, and 54 formed by the organic material is defined as 1.5 mm$\leq$H$\leq$7.0 mm. Further, in the same way as the embodiment shown in FIG. 1, application of hydrophilic processing to the surface of the outwardly projecting strands 14, 24, 34, 44, and 54 is preferred from the viewpoint of the prevention of corona noise.

FIG. 7 to FIG. 11 show an overhead power transmission line according to another embodiment of the present invention in which an anti-unraveling means for preventing unraveling of the outwardly projecting strand 4 is provided at the overhead power transmission lines of the previous embodiments.

Figure 7:
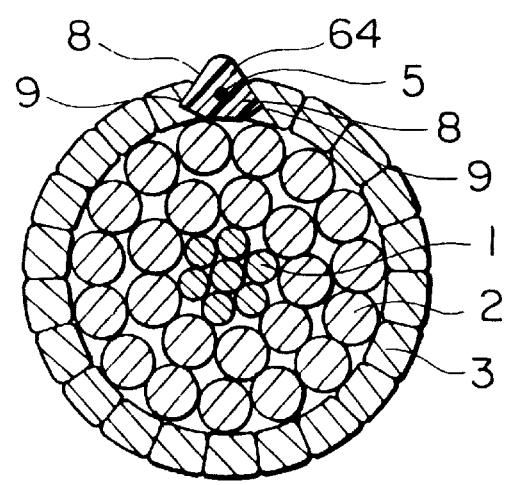

In the embodiment shown in FIG. 7, projections 8 are provided the two sides of the outwardly projecting strand 64 formed by an organic material. Corresponding to these projections 8, recesses 9 are provided in the outermost layer strands 3 positioned at the two sides of the strand 64. The strands are stranded with each other with the projections 8 and recesses 9 fit with each other.

When stranding the outwardly projecting strand 64 and the outermost layer strands 3 with each other with the projections 8 and recesses 9 fit with each other in this way, even if the outwardly projecting strand 64 breaks, the strand 64 will not dangle down. Accordingly, short-circuits and other accidents caused when the strand 64 dangles downward can be reliably prevented.

Figure 8:
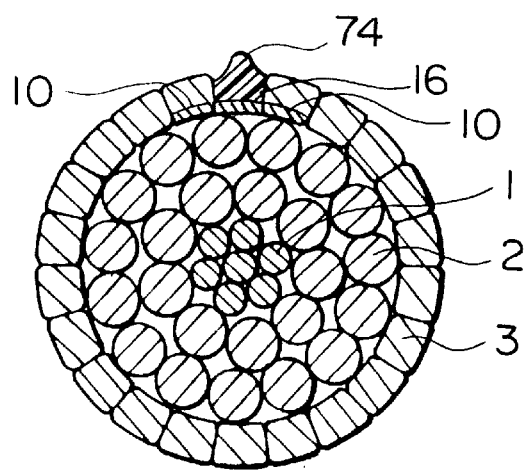

In the embodiment shown in FIG. 8, projections 10 having the same width as that of the outermost layer strands 3 are provided at the two sides of the lower portion of the outwardly projecting strand 74 formed by an organic material. Each projection 10 is configured so as to be pressed by the outermost layer strands 3 positioned on the two sides. In this way, by pressing the projections 10 provided at the two sides of the lower portion of the outwardly projecting strand 74 by the outermost layer strands 3, dangling of the outwardly projecting strand 74 due to breakage can be effectively prevented. Note that, it is also possible to configure the members constituting the projections 10 provided at the lower portion of the strand 74 by a semiconductor member different from the strand 74 comprised by the organic material. In this case, in the same way as the embodiment shown in FIG. 4, it is possible to reliably prevent a gap discharge between the strands 3 of the outermost layer positioned at the two sides of the strand 74.

Figure 9:
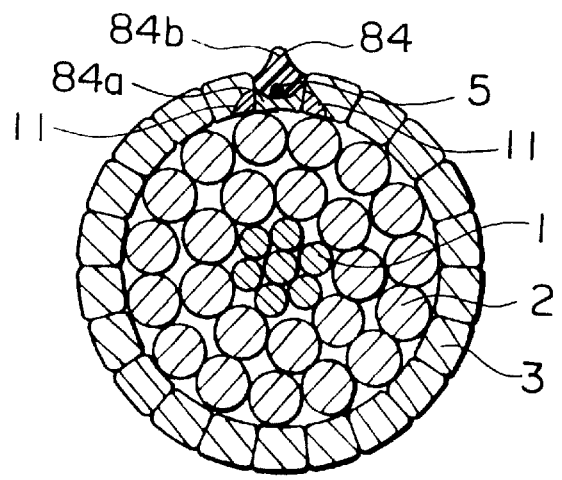

In the embodiment shown in FIG. 9, the outwardly projecting strand 84 is formed by combining a semiconductor 84a and an insulator 84b comprised by an organic material. Projections 11 having a smaller width than that of the outermost layer strands 3 are formed at the two sides of the lower portion of the semiconductor 84a. These projections 11 are configured so as to be pressed by the outermost layer strands 3 positioned at the two sides of the strand 84. By this, the dangling of the outwardly projecting strand 84 due to breakage can be reliably prevented. Further, in the same way as the embodiment shown in FIG. 4, it is possible to reliably prevent a gap discharge between the strands 3 of the outermost layer positioned at the two sides of the strand 84.

Figure 10:
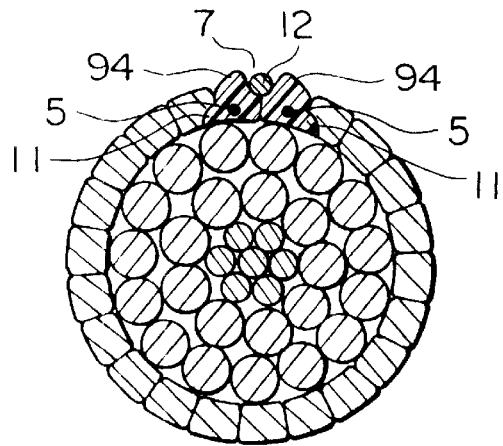

The embodiment shown in FIG. 10 is a modification of the embodiment shown in FIG. 5. In this embodiment, projections 11 having a smaller width than that of the outermost layer strands 3 are provided at the two sides of the lower portions of two outwardly projecting strands 94 formed by an organic material. These projections 11 are configured so as to be pressed by the outermost layer strands 3 positioned at the two sides of the strands 94. Further, a holding strand 12 is fit in the U-shaped groove 7 formed between the two outwardly projecting strands 94. The holding strand 12 is preferably constituted by a material having a stronger tensile strength than that of the outwardly projecting strands 94 and is made by a metal wire such as for example a steel wire. The two ends of this holding strand 12 in the longitudinal direction are fastened by a fastening member etc.

Figure 11:
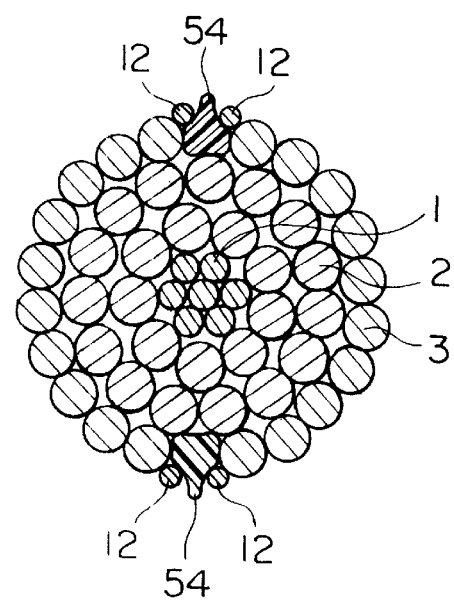

The embodiment shown in FIG. 11 is a modification of the embodiment shown in FIG. 6. In this embodiment, holding strands 12 are provided at the two sides of the outwardly projecting strands 54 formed by an organic material. In the same way as the embodiment of FIG. 10, a metal wire such as a steel wire can be used as the holding strands 12 and the two ends of the holding strands 12 are fastened by a fastening member etc.

Note that, in the same way as the embodiment shown in FIG. 1, the projection height H of the outwardly projecting strands 64, 74, 84, and 94 formed by an organic material is defined as 1.5 mm$\leq$H$\leq$7.0 mm and the surface of the outwardly projecting strand 4 is preferably processed to make it hydrophilic from the viewpoint of the prevention of corona noise.

FIG. 12 to FIG. 18 show overhead power transmission lines according to other embodiments of the present invention in which the outwardly projecting strands formed by an organic material are provided with anti-unraveling means.

Figure 12:
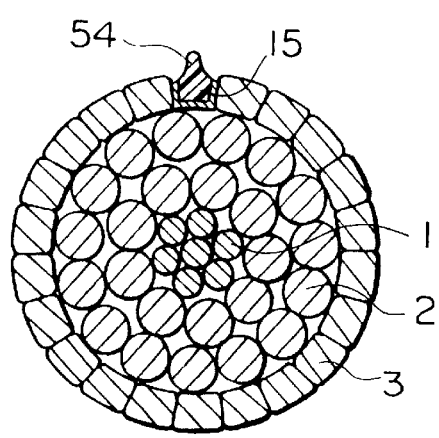

In the embodiment shown in FIG. 12, the lower surface and the two sides of the outwardly projecting strand 54 formed by an organic material are covered by a reinforcing material 15 having a U-shaped cross-section, and the outwardly projecting strand 54 is fixed to the reinforcing material 15. As the reinforcing material 15, aluminum plate, aluminum tube, zinc-plated iron plate, composite metal plate, etc. can be used, but the use of the same material as that of the outermost layer strand 3 constituting the overhead power transmission line is preferred from the viewpoint of the prevention of galvanic corrosion.

If the outwardly projecting strand 54 formed by an organic material is reinforced by the reinforcing material 15 in this way, even if the outwardly projecting strand 54 breaks, the strand 54 will not dangle down, so short-circuits and other accidents caused due to the dangling of the strand 54 can be reliably prevented.

Figure 13:
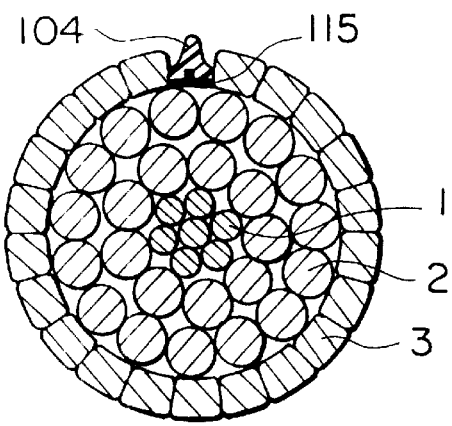

In the embodiment shown in FIG. 13, a reinforcing material 115 having a peak-shaped cross-section is affixed to the lower surface of the outwardly projecting strand 104 formed by an organic material.

Figure 14:
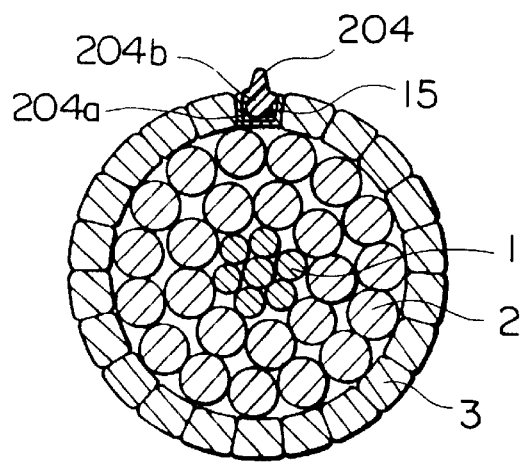

In the embodiment shown in FIG. 14, a reinforcing material 15 having a U-shaped cross-section is affixed to the lower surface and two sides of an outwardly projecting strand 204 formed by an organic material obtained by combining a semiconductor 204a and an insulator 204b.

Figure 15:
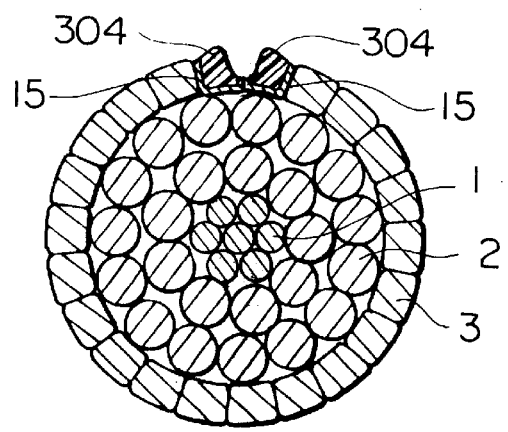

In the embodiment shown in FIG. 15, reinforcing materials 15 are affixed to the lower surfaces and two sides of two outwardly projecting strands 304 formed by an organic material.

In the embodiment shown in FIG. 16, reinforcing materials 15 having U-shaped cross-sections are affixed so as to cover the lower surfaces and two sides of outwardly projecting strands 54 formed by an organic material arranged at positions facing each other 180 degrees apart.

In the embodiment shown in FIG. 17, a reinforcing material 215 having a U-shaped cross-section is affixed to the lower surface and two sides of a two-peak type outwardly projecting strand 404 formed by an organic material.

FIGS. 18A to 18D show other embodiments of the outwardly projecting strands 504, 604, 704, and 804 formed by an organic material and reinforcing materials 515, 615, 715, and 815. In the embodiment shown in FIG. 18A, the outwardly projecting strand 504 formed by an organic material and the reinforcing material 515 having the U-shaped cross-section are integrally formed. In the embodiment shown in FIG. 18B, an outwardly projecting strand 604 formed by an organic material is integrally formed on an reinforcing material 615 having a comb-like shape. In the embodiment shown in FIG. 18C, a two-peak type outwardly projecting strand 704 formed by an organic material and a reinforcing material 715 having a U-shaped cross-section are integrally formed. In the embodiment shown in FIG. 18D, a reinforcing material 815 is integrally formed so as to cover the lower portion of an outwardly projecting strand 804 having an I-shaped cross-section.

Note that the shapes of the outwardly projecting strand formed by an organic material and the reinforcing material are not restricted to those of the above embodiments.

In the embodiments shown in FIG. 12 to FIG. 18, in the same way as the embodiment shown in FIG. 1, the projection height H of the outwardly projecting strand formed by an organic material is defined as 1.5 mm≦H≦7.0 mm and the surface of the outwardly projecting strand is preferably processed to make it hydrophilic from the viewpoint of the prevention of corona noise.

Figure 19:
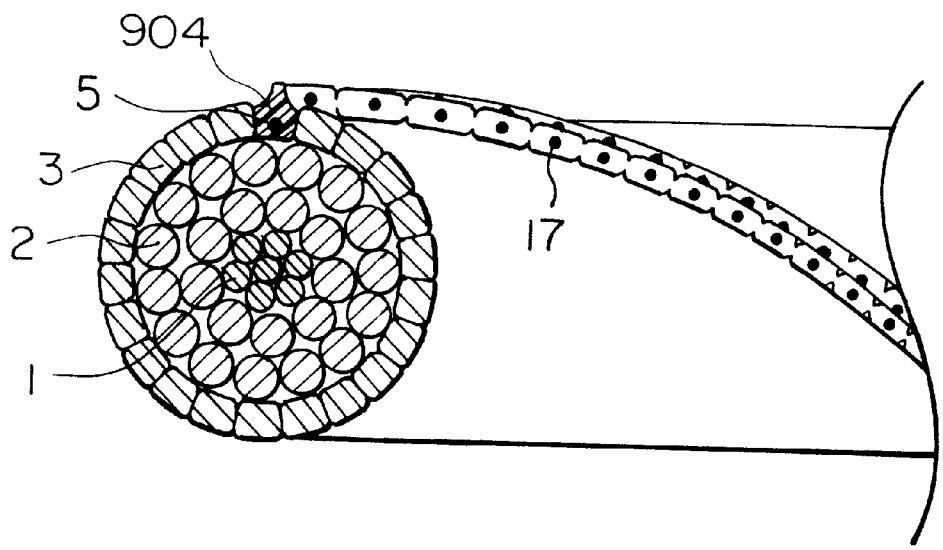
FIG. 19 is a partially sectional perspective view of the overhead power transmission line according to another embodiment of the present invention.

FIG. 19 shows an overhead power transmission line according to another embodiment of the present invention. A large number of small uneven portions 17 are formed on the surface of the outwardly projecting strand 904 formed by an organic material.

As a means for forming the large number of small uneven portions 17 on the surface of the outwardly projecting strand 904 formed by an organic material, there are the method of forming uneven portions 17 by pressing by a roll etc. at the time of shaping the strand 904, the method of dropping a dissolved organic material on the shaped strand 904, the method of forming uneven portions 17 by pressing by a roll etc. on the shaped strand 904, and so on.

Note that, in FIG. 19, in the same way as the embodiment shown in FIG. 1, the projection height H of the outwardly projecting strand 904 formed by an organic material is defined as 1.5 mm≦H≦7.0 mm and the surface of the outwardly projecting strand 904 is preferably processed to make it hydrophilic from the viewpoint of the prevention of corona noise.

FIGS. 20A to 20D show various modifications of the small uneven portions 17, 117, 217a, 217b, 317a, and 317b to be formed on the surface of the outwardly projecting strand 904 formed by an organic material.

Figure 20A:
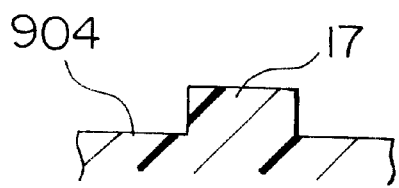
FIGS. 20A top 20D are sectional views showing other embodiments of uneven portions provided on the surface of the outwardly projecting strand useable in the present invention.
Figure 20B:
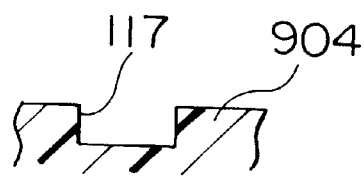
Figure 20C:
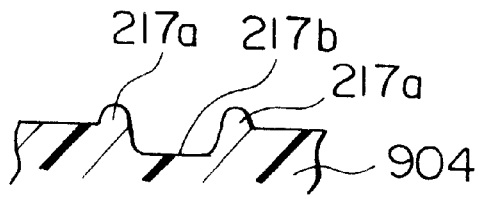
Figure 20D:
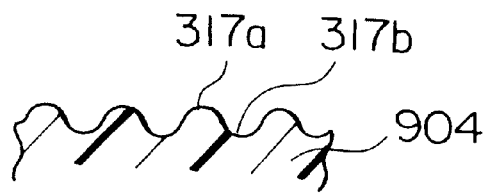

FIG. 20A shows a circular projection 17, while FIG. 20B shows a circular recess 117. The bottom of the circular recess 117 is not restricted to a flat bottom and may be a curved bottom as well. FIG. 20C shows a combination of ring-like projection 217a and a circular recess 217b. The bottom of the circular recess 217b is not restricted to a flat bottom and may be a curved bottom as well. FIG. 20D shows an example wherein stripe-like projections 317a and stripe-like recesses 317b are alternately formed.

Of course, the shape of the small uneven portions to be formed on the surface of the outwardly projecting strand 904 formed by an organic material is not restricted to the shapes of the above embodiments.

Next, an explanation will be made of how to make the projection height H of the outwardly projecting strand formed by an organic material within a range of from 1.5 mm≦H≦7.0 mm.

Figure 21:
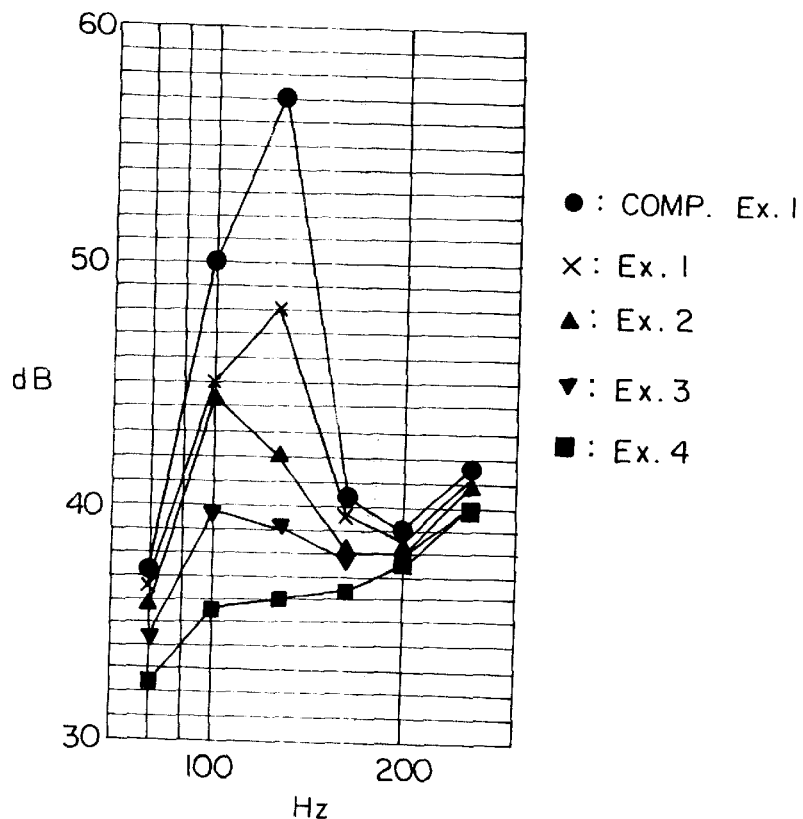
FIG. 21 is a graph examining the change of the wind noise characteristic due to the change of the projection height of the outwardly projecting strand according to the embodiment of the present invention.

FIG. 21 is a graph examining the change of the wind noise characteristic due to the change of the projection height H of the outwardly projecting strand. This experiment was carried out by blowing wind at a speed of 20 m/sec to an overhead power transmission line having a diameter of 32 mm. The black dots show the case of no projection (Comparative Example 1), the x marks show the case of a projection height of 1 mm (Example 1), the black triangles show the case of a projection height of 1.5 mm (Example 2), the black wedges show the case of a projection height of 3.0 mm (Example 3), and the black squares show the case of a projection height of 7.0 mm (Example 4).

As apparent from the graph, in the case of no projection, the wind noise characteristic is conspicuously degraded at 125 Hz. Contrary to this, where the projection height is 1 mm, only a reduction of 9 dB is obtained at 125 Hz, but where the projection height is 1.5 mm or more, a reduction of 15 dB or more is obtained. Accordingly, preferably the projection height is 1.5 mm or more.

On the other hand, even if the projection height is 7.0 mm or more, a wind noise characteristic is obtained, but if the projection height is 7.0 mm or more, there is a problem that it becomes impossible to use the conventional gripping portions of parts such as spacers and dampers as they are. For this reason, preferably the projection height is 7.0 mm or less. Namely, where the projection height H is 7.0 mm or more, the contact between the overhead power transmission line and the gripping portions of the parts is poor. For this reason, stress during vibration is concentrated at one part of the gripping portions. Accordingly, it becomes impossible to use the conventional gripping portions of spacers, dampers, and other parts as they are.

Figure 22:
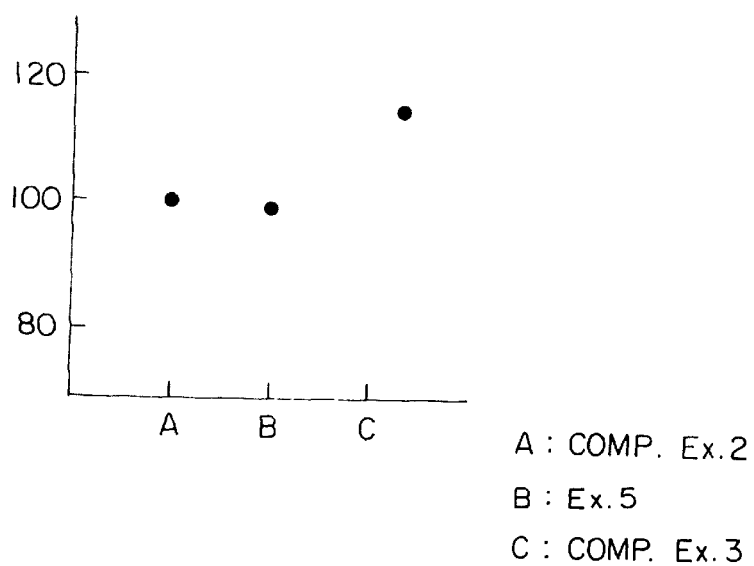
FIG. 22 is a graph measuring the wind pressure load of an overhead power transmission line according to an embodiment of the present invention and overhead power transmission lines according to comparative examples.

FIG. 22 is a view of measuring the wind pressure load per unit length of the overhead power transmission lines A, B, and C. The overhead power transmission line A according to Comparative Example 2 is a steel-reinforced aluminum cable of 810 mm². The overhead power transmission line B according to Example 5 is the steel-reinforced aluminum cable of 810 mm² the same as that of Comparative Example 2 but with an outwardly projecting strand 14 (projection height H=4.0 mm) as shown in FIG. 2. The overhead power transmission line C according to Comparative Example 3 is a cable obtained by winding a spiral rod of 6 mm² around the outer circumference of a steel-reinforced aluminum cable of 810 mm².

In FIG. 22, the wind speed is set to 40 m/sec, and the wind pressure load of the steel-reinforced aluminum cable of 810 mm² of Comparative Example 2 is indicated as 100. As apparent from FIG. 22, it is seen that the overhead power transmission line according to Example 5 has a reduced wind pressure load per unit length compared with Comparative Example 3. The overhead power transmission line of Comparative Example 2 is equivalent to the overhead power transmission line of Example 5 in the point of the wind pressure load, but inferior to the overhead power transmission line of the examples in the point of the noise characteristic as shown in FIG. 21.

Figure 23:
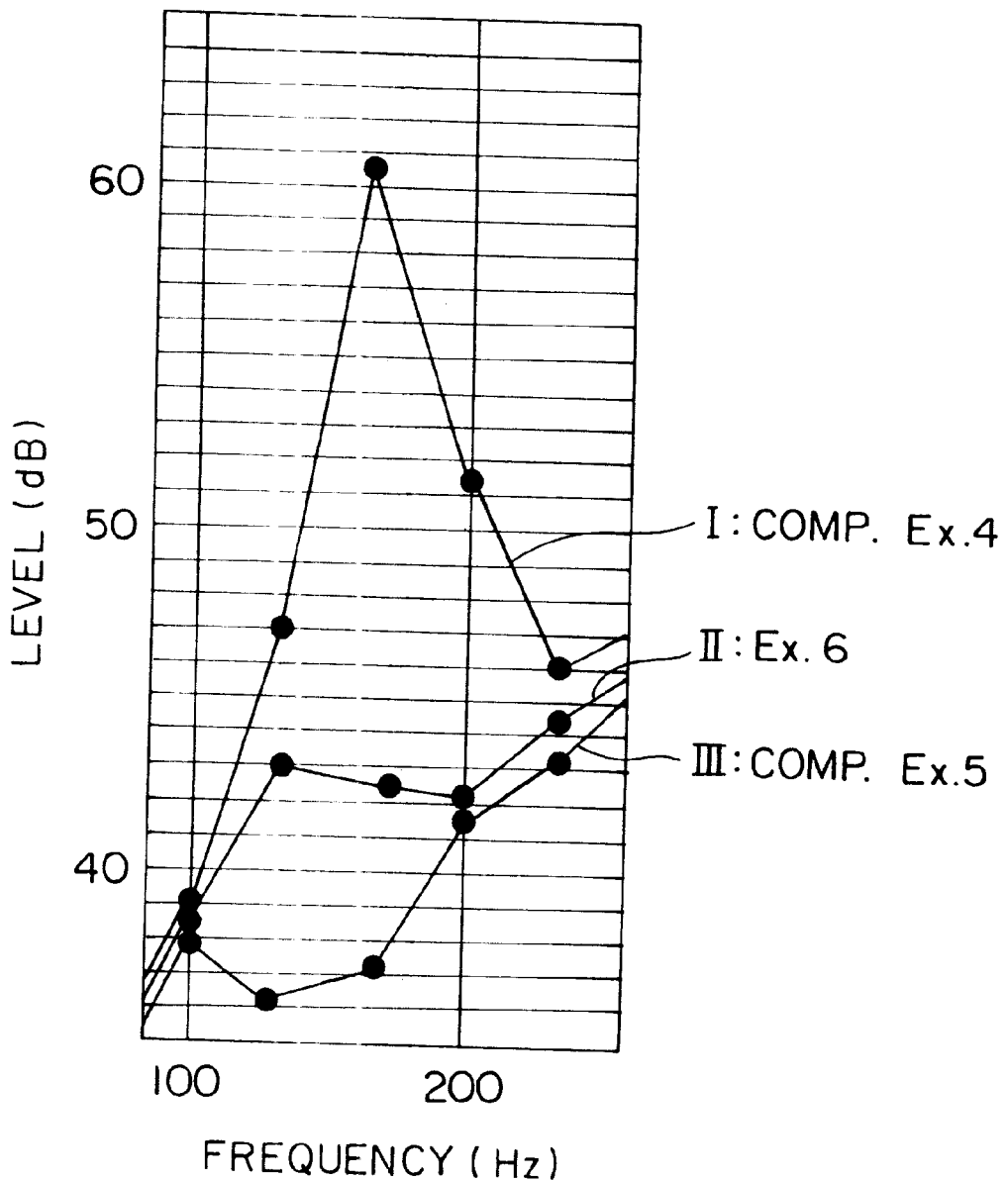
FIG. 23 is a graph examining the effect of reduction of the wind noise of an overhead power transmission line according to the embodiment of the present invention and overhead power transmission lines according to comparative examples.

FIG. 23 is a graph examining the wind noise reduction effect of the overhead power transmission lines I, II, and III. Note that, the wind speed is 20 m/s.

The overhead power transmission line I according to Comparative Example 4 is a steel-reinforced aluminum cable of 410 mm². The overhead power transmission line II according to Example 6 is a steel-reinforced aluminum cable of 410 mm² the same as that of Comparative Example 4 but with an outwardly projecting strand 14 (projection height H=4.0 mm) as shown in FIG. 2. The overhead power transmission line III according to Comparative Example 5 is a conventional product obtained by winding a spiral rod of 6 mm² around the outer circumference of a steel-reinforced aluminum cable of 410 mm².

As apparent from FIG. 23, in the overhead power transmission line II according to Example 6, at a frequency of 160 Hz, a wind noise reduction effect of about 17 dB is obtained compared with the steel-reinforced aluminum cable I of 410 mm² according to Comparative Example 4.

Further, in the same overhead power transmission lines I, II, and III as those described above, when the corona noise level at the cable surface maximum potential frequency 15 kV/cm was measured, the level was 36.0 in the line I according to Comparative Example 4, the level was 36.5 in the line II according to Example 6, and the level was 39.0 in the line III according to Comparative Example 5.

In this way, it is seen that the overhead power transmission line according to the present embodiment has a conspicuously low corona noise compared with the cable of Comparative Example 5 which is a conventional product.

Note that, the overhead power transmission line according to the present invention is not restricted to the above embodiments. The shape of the outwardly projecting strand formed by an organic material, the number of strands, the positions thereof, etc. can be freely selected. For example, it is also possible to use three outwardly projecting strands formed by an organic material and arrange these three strands at positions 120 degrees apart.

Further, the shape of the strands constituting the overhead power transmission line is not restricted to a round cross-section or arcuate cross-section. For example a trapezoidal shape, a shape in which the adjoining strands are fit, etc. can be adopted too.

Further, the present invention is not restricted to an overhead power transmission line according to the above embodiments. It can be applied also to an overhead ground wire. As the overhead ground wire, there is an OPGW (optical ground wire) in which a plurality of optical fibers are arranged in the internal portion. By stranding at least one outwardly projecting strand with the outermost layer of this OPGW and making at least the outwardly projecting portion of this outwardly projecting strand by an organic material, the present invention can be applied also to an OPGW.

Figure 24:
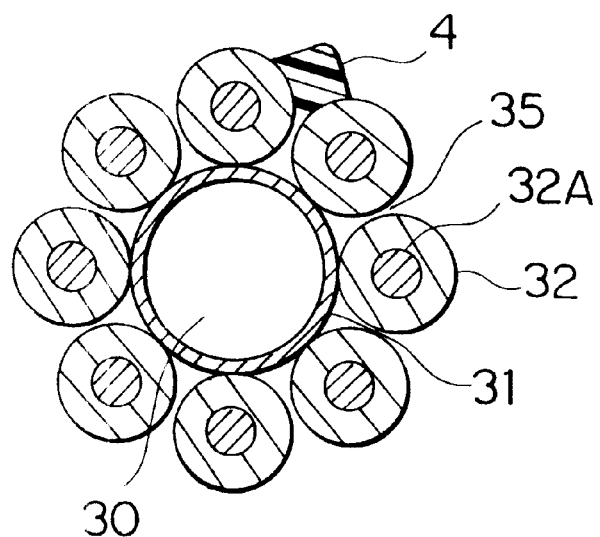
FIG. 24 and FIG. 25 are sectional views of the embodiments applying the present invention to OPGW.

FIG. 24 shows an overhead cable (OPGW) containing optical fibers which comprises an aluminum pack 31 containing optical fibers 30 around which are stranded eight aluminum-coated steel wires 32 each comprised of a steel core 32A coated by aluminum. A projecting strand 4 is stranded in a groove 35 on the outer circumference.

Figure 25:
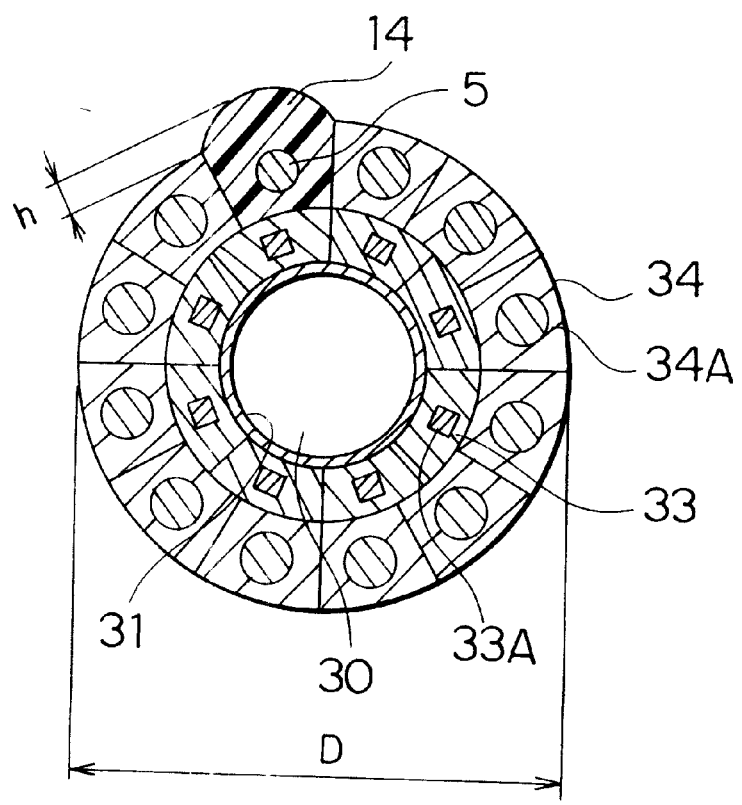

FIG. 25 shows an overhead cable (OPGW) containing optical fibers comprised of an aluminum pack 31 containing optical fibers around which are stranded two kinds of arcuate cross-section segmented strands 33 and 34. The strands 33 and 34 have respectively steel cores 33A and 34A. A projecting strand 14 is stranded into the place of one outer layer strand 34 which has been omitted.

The projecting strands in the embodiments explained above may be made the various forms shown above. They are not limited to one. Several projecting strands may be attached at symmetric positions.

Further, when using two projecting strands at symmetric positions, the ratio h/D can be made about half that in the case of provision of a single strand. Further, by making the h/D of the case of the single strand 5 to 10 percent, it is possible to reduce the wind noise level by 7 to 10 dB compared with the original form of the cable with no such strands provided.

What is claimed is:

1. An overhead cable formed by stranding at least one outwardly projecting strand at the outermost layer of an overhead cable formed by a plurality of strands, wherein at least an outwardly projecting portion of said at least one outwardly projecting strand is composed of an organic material, wherein a reinforcing core is provided in an internal portion of said outwardly projecting strand.

2. The overhead cable as set forth in claim 1, wherein small uneven portions are provided on the surface of said outwardly projecting strand.

3. The overhead cable as set forth in claim 1, wherein said at least one outwardly projecting strand is two outwardly projecting strands stranded adjacent to each other and a groove is formed between these outwardly projecting strands.

4. The overhead cable as set forth in claim 3, wherein a holding strand is fit in said groove.

5. An overhead cable formed by stranding at least one outwardly projecting strand at the outermost layer of an overhead cable formed by a plurality of strands, wherein at least an outwardly projecting portion of said at least one outwardly projecting strand is composed of an organic material, wherein said outwardly projecting strand is formed by integrally forming a semiconductor formed at a lower portion and an insulator formed at an upper portion.

6. An overhead cable formed by stranding at least one outwardly projecting strand at the outermost layer of an overhead cable formed by a plurality of strands, wherein at least an outwardly projecting portion of said at least one outwardly projecting strand is composed of an organic material, wherein said outwardly projecting strand is provided with an anti-unraveling means preventing unraveling due to breakage.

7. The overhead cable as set forth in claim 6, wherein said anti-unraveling means is comprised of side projections formed at two sides of said outwardly projecting strand, and said side projections are fit in grooves of the ordinary strands positioned at the two sides of said outwardly projecting strand.

8. The overhead cable as set forth in claim 6, wherein said anti-unraveling means are bottom projections formed at two sides of the bottom of said outwardly projecting strand, and said bottom projections are pressed inward at the bottoms of the ordinary strands positioned at the two sides of said outwardly projecting strand.

9. The overhead cable as set forth in claim 8, wherein members constituting said bottom projections are comprised of semiconductor members separate from the member constituting said outwardly projecting strand and are joined to the outwardly projecting strand.

* * * * *